United States Patent [19]
Schraven

[11] 3,884,667
[45] May 20, 1975

[54] TUNNEL FURNACE, AND A METHOD OF OPERATING SAME

[75] Inventor: Willem Schraven, Nijmegen, Netherlands

[73] Assignee: Smit Nijmegen B.V., Nijmegen, Netherlands

[22] Filed: Sept. 17, 1973

[21] Appl. No.: 398,020

[30] Foreign Application Priority Data
Nov. 29, 1972 Japan.............................. 47-117660

[52] U.S. Cl....................... 65/119; 65/162; 65/350; 65/351
[51] Int. Cl............................................ C03b 25/04
[58] Field of Search ............ 65/118, 119, 162, 349, 65/350, 351, 117, 348

[56] References Cited
UNITED STATES PATENTS
2,544,947  3/1951  Baker.................... 65/119
2,822,645  2/1958  Weller et al. ............ 55/351

*Primary Examiner*—Arthur D. Kellogg
*Attorney, Agent, or Firm*—Fitch, Even, Tabin & Luedeka

[57] ABSTRACT

A method and apparatus for the heat treatment of articles in a tunnel furnace comprises means for transporting the articles in longitudinal direction through a tunnel furnace having separate successive sections each with variable temperature controls, means for controlling the temperature of the air in each of the sections and for circuiting the air transversely across the articles traveling longitudinally therein to obtain a more uniform temperature about the articles in each section, and means for controlling and for inducing a longitudinal flow of air between sections by controlling air inlet and exhaust damper means to vary the quantity of cooling air admitted relative to the quantity of exhaust air expelled. The method and apparatus provide a better adjustment of the temperature curve for the articles passing through the furnace.

3 Claims, 7 Drawing Figures

TUNNEL FURNACE, AND A METHOD OF OPERATING SAME

The present invention relates to a method for the heat treatment of articles, especially glass articles which are conveyed through a horizontal tunnel furnace having separate, successive sections, and to a tunnel furnace for carrying out such method.

It is already known to construct tunnel cooling or annealing furnaces for glass articles which are supplied by glass forming machines, in the form of separate, successive sections. Hereby, the glass articles are conveyed through the elongated tunnel furnace by means of an endless belt.

It is essential that the tunnel furnace has adjusted therein a temperature curve at which the glass articles, prior to the cooling process thereof, are subjected to a maximum temperature of e.g. more than 450° in order to relieve the stresses caused by the forming process.

It is disadvantageous with the conventional tunnel furnaces that they show high heat losses due to the intrusion of cold air at the inlet end of the cooling furnace, that it is not possible to recover the heat to be dissipated for initial heating, that the desired temperature curve is difficult to be adjusted therein without fluctuations of temperature, that in the case of variations of the load or charge the temperature curve in the rear section of the furnace cannot be substantially maintained without the use of heating elements, and variations in the surrounding flows can be compensated for incompletely only, and that the tunnel furnaces, on the whole, are expensive, not very economical and subject to trouble.

In contrast herewith, it is the object of the present invention to provide a method of conveying articles within a predetermined temperature curve and particularly for the controlled cooling of glass articles, as well as a tunnel furnace for carrying out such method, which no longer suffer from the abovementioned disadvantages and from the disadvantages of the prior art and which, particularly with minimum consumption of energy and with economical expenditure, permit to pass or convey articles along a desired temperature curve, whereby the temperature is first allowed to rise, whereupon it is maintained within the critical temperature range and then permitted to decrease in a relatively rapid manner, without causing inadmissible temperature fluctuations between the separate tunnel furnace sections to occur.

In particular, it is the object of the present invention to produce within the tunnel furnace according to the invention a longitudinal flow by means of simple control elements which are already present within the individual sections, thereby rendering possible a more exact adjustment of the temperature curve passed through by the glass articles, with minimum expenditure.

According to the present invention, this object is solved in that heated air is circulated in transverse flow within individual furnace sections, whereby additional cooling air may be sucked in by the circulating fan and a quantity of exhaust air corresponding to the quantity of cooling air taken in may be exhausted.

Advantageously, for the adjustment of a longitudinal flow within the treatment furnace, in the individual sections thereof, a greater quantity of cooling air may be sucked in than the quantity of exhaust air that is vented, or a greater quantity of exhaust air may be vented than the quantity of cooling air that is sucked in, in dependency of the temperature values existing in the sections upstream or downstream of the respective section.

Advantageously, the tunnel furnace according to the invention is characterized by a circulating fan each for circulating the cooling air in transverse flow within each section, means for supplying cooling air within some sections, and means for exhausting the exhaust air from these sections in dependency of the desired temperature.

Preferably, further the tunnel furnace according to the invention for the provision of any desired longitudinal flow by using most simple means, i.e., by making use of the existing means for the adjustment or control of the inlet air and of the outlet air, may comprise control means which, in response of a temperature-dependent control signal from another section, are capable of adjusting the inlet air means and the exhaust air means in such a manner that an excess of air is sucked in or an excess air is exhausted as exhaust air, such that any desired partial vacuum or overpressure and, thus, any desired longitudinal flow through the sections can be set within the furnace sections.

Below, an exemplary embodiment of the invention is explained in greater detail by referring to the accompanying drawings, wherein.

As shown in the Figures, the tunnel furnace according to the invention and generally shown at 1 compromises separate sections 2 and which are followed by an outlet segment 4. A conveyor belt 5 runs to and fro within the furnace, which conveyor belt is re-routed and driven at the front and rear ends of the furnace. The conveyor belt 5 consists of a heat resistant and resilient material, e.g. steel wire, and includes apertures of sufficient size such that air may circulate through the belt.

Interiorly of the furnace, the belt 5 rests on a support or backing 6 which is likewise provided with apertures for the passage of air therethrough; the belt is moved along a return path within the furnace, and the glass articles to be cooled are simply placed onto the belt in front of the inlet end of the furnace and removed after their exit from the furnace.

Figure 1:
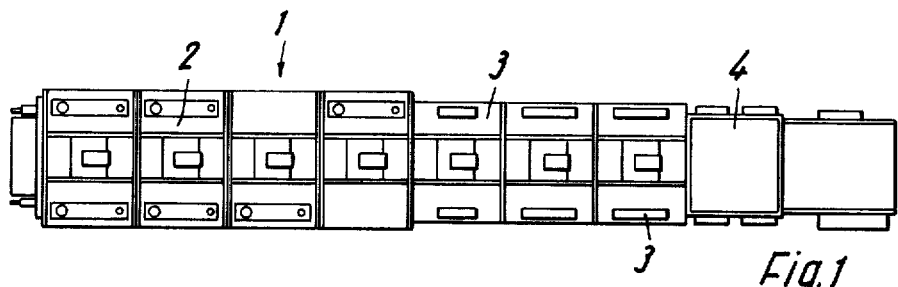
FIG. 1 is a plan view of a tunnel furnace according to the invention.
Figure 2:
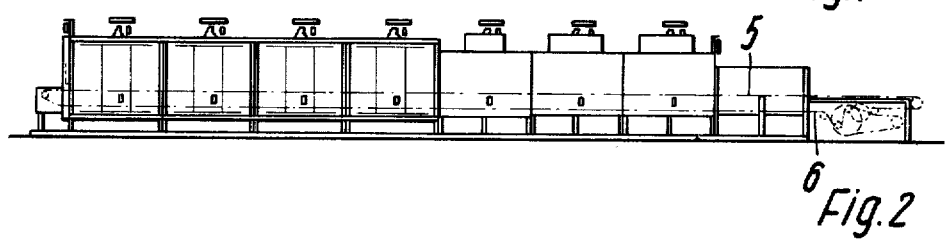
FIG. 2 is an elevational view of a tunnel furnace according to the invention.

As shown in FIGS. 1 and 2, the furnace 1 according to the present invention, as seen in the direction of travel of the conveyor belt 5, includes high temperature cooling sections 2 at its forward end, and adjoining cooling sections 3 for lower temperatures. The construction of the furnace 1 can be performed in most easy manner, since the individual sections may be completely produced at the factory and then assembled to form the complete furnace, whereupon the conveyor belt 5 need only be passed through the entirety of the sections.

Figure 4:
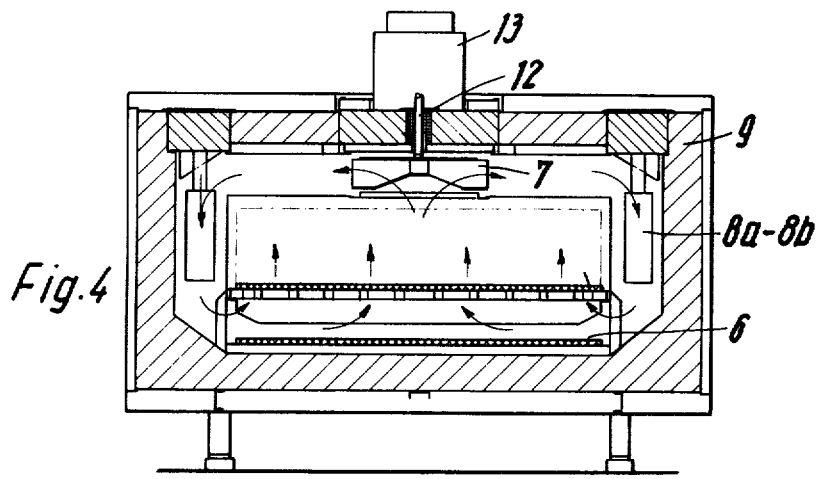
FIG. 4 is a cross-sectional view through a section of the heating portion of the tunnel cooling furnace according to the invention.

As shown in FIG. 4, the individual section 2 or 3 comprises a peripheral insulation 9 within a rigid frame 10 which rests on feet 11. Below the ceiling of this section, a fan 7 is mounted which is driven by an electric motor 13 via a shaft 12 passing through the insulation 9. On one side or on both sides of the section, expedient heating elements 8a or cooling elements 8b are provided, and the fan 7 sucks the cooling or heating air through the upper surface of the conveyor belt 5 and the glass articles (not illustrated) placed onto the conveyor belt, and delivers the air laterally towards the heating elements 8 through which the air stream descending along the outer walls flows, which air flow then passes into the space between the lower and upper sides of the conveyor belt and then continues to circulate in the manner described above.

Figure 5:
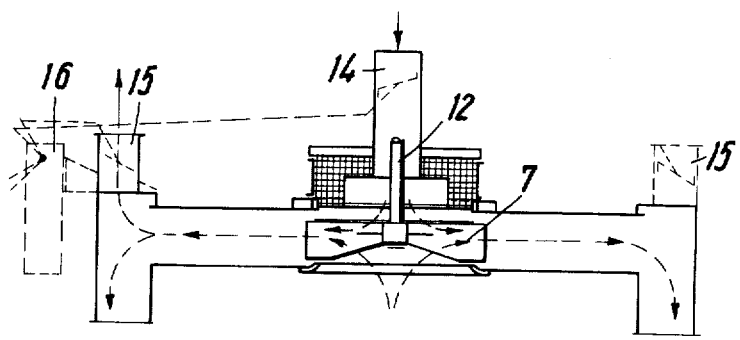
FIG. 5 is a partial view of a section of the cooling portion including means for the controlled introduction and exhaust of air into and from such section.

In another embodiment of the invention as shown in FIG. 5, the temperature may be adjusted in each section by permitting the fan 7 to take in cold air from the outside and, furthermore, by allowing heated air which is mixed with the cold air, to exit from the section.

According to FIG. 5, on both sides of the ceiling of the section there are provided openings including valves or dampers 15 which may be adjusted by means of a control element 16. In order to take in cold air, a suction port including a further valve or damper 14 is arranged concentrically to the shaft 12, which valve or damper is likewise adapted to be adjusted by the control element 16.

Figure 3:
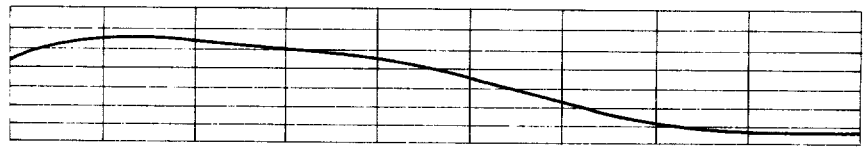
FIG. 3 is a diagram of the temperature curve adjusted over the length of the tunnel furnace during the cooling of a shaped hollow glass article.

In case that the temperature should increase excessively within a section, namely above the average temperature value according to the temperature curve of FIG. 3 or any other desired temperature curve, the control element 16 under the action of a temperature measuring element opens the valves 14 and 15 such that cold air is sucked in by the fan 7 and mixed with the circulated hot air, and such that the portion of the air which is not required for producing the longitudinal flow, may flow out through the valves 15. In manual operation, the control element 16 is adjusted directly by the operators.

Figure 7:
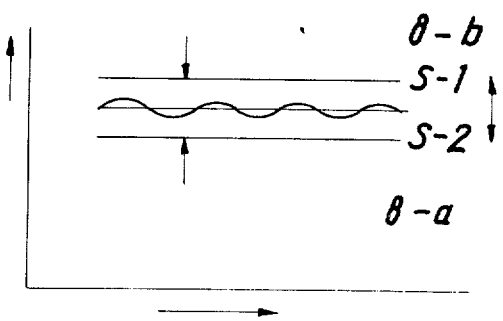
FIG. 7 is a schematical showing of the control of a segment in response of the temperature and of the longitudinal flow existing therein.

As shown in FIG. 7, the above-described control is put into function within the limiting lines S-1 and S-2. The more the temperature varies within these limiting values, the more the values 14 and 15 are opened. Above the limiting value S-1, a closed cooling element 8-b is activated, while a heating element 8-a is activated below the limiting value S-2. The cooling elements or the heating elements, respectively, are associated with the section in which the thermocouple is disposed.

Figure 6:
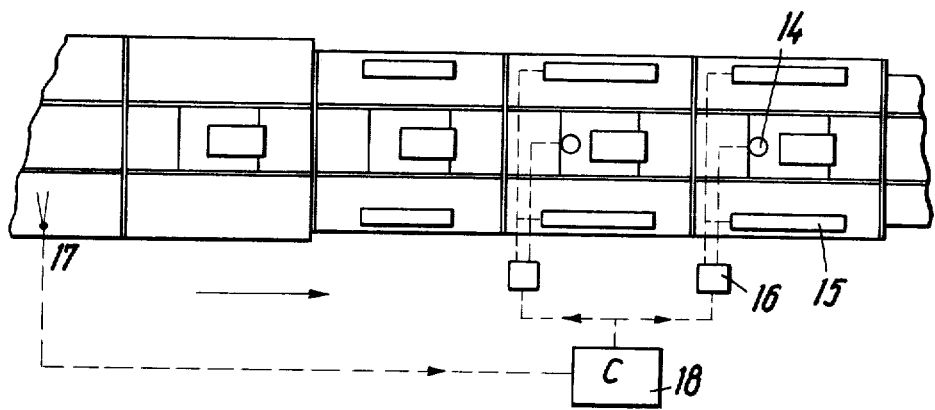
FIG. 6 is a schematical showing of the control of a cooling section according to FIG. 5 in response of the measured value of a section positioned upstream thereof with a spacing.

In a manner being surprising to the expert, it is now possible to adjust by means of a control pattern as shown in FIG. 6 a longitudinal flow within the tunnel cooling furnace according to the invention, by measuring the temperature at 17 within a section leading in the direction of travel of the belt, and by producing a control signal by means of a comparison of the actual value with the set point value, which control signal, in turn, acts upon the control elements 16 and in the rear or trailing sections effects an adjustment of the valves 15 and 14 in such a manner that the latter either allow a greater quantity of air to be sucked in than the quantity of air which is exhausted, or a smaller quantity of air to be taken in than the quantity of air which is exhausted. Of course, the operating personnel may effect an adjustment of the valves or dampers 14 and 15 directly on the basis of temperature rises.

Hereby, a more or less high overpressure or partial vacuum is produced within the rear sections, such that a longitudinal flow is adapted to be controlled.

The control according to the invention provides particular economical advantages because it makes use of the already existing valves 14 and 15 and of the control elements 16, and because only one additional temperature measuring point 17 and a controller 18 are required.

However, it has been found that, in spite of the low expenditure, a longitudinal flow through the furnace may be adjusted both as a counter flow relative to the direction of belt travel and as a concurrent flow for special cases.

The present provision of the counter air flow along the tunnel furnace is of particular advantage because it provides for an energy economizing countercurrent heating of the glass articles, because the air intake at the furnace inlet is reduced, because an easier adjustment of another countercurrent air flow when employing other glass articles having a different cooling curve becomes possible, because a compensation of the various exterior influences upon the sections, e.g. when hall doors are opened or the like, is rendered possible, and because a more rapid cooling of the glass due to a more ideally adjusted cooling curve is obtained.

Further, if necessary, by providing a concurrent air flow a heating of the not heated furnace sections may be effected from the heated furnace sections, such that the starting or shut-down periods may be shortened thereby.

As apparent, the control according to the invention offers a great number of most varied possibilities for controlling and adjusting the desired cooling curve, since the temperature of various sections, individually or in combination, may be used for the control of the pressures existing in various other sections, both individually or in combination.

It has been found to be particularly expedient to effect the temperature measurement for the control of the longitudinal flow in the last section, i.e. the so-called "critical" zone, whereby the control per se is performed in cooling sections as shown in FIG. 6. When the load or charge is varied, by closing and opening the valves and dampers in the rear portion of the furnace which is not equipped with heating elements, and by varying the longitudinal flow which are affected by these valves and dampers, provisions are made that the optimum temperature curve in this furnace portion is substantially maintained regardless of varying loads.

The tunnel furnace according to the invention may be used not only for the cooling of glass articles, but also for the baking of stove enamels on the glass, for the shaping of glass articles and other heat treatments of glass, ceramic material and the like.

Apparently, the control method according to the invention as well as the correspondingly constructed furnace, thus, offer a variety of advantages being surprising to the expert.

What we claim is:

1. A method for the heat treatment of articles comprising transporting said articles in a longitudinal direction through a horizontal tunnel furnace having separate successive sections each with variable temperature controls, controlling the temperature of the air in each of said sections by operating said variable temperature controls, circulating air transversely to the articles traveling in the longitudinal direction to obtain a more uniform air temperature about the articles in each section, drawing air into each section by a selectively controlled air damper and fan means in each section, exhausting air from each section through selectively controlled outlet damper means in each section, sensing the temperature in said sections, inducing a longitudinal flow of air between adjacent sections by varying the pressure between sections, and controlling in accordance with the temperature values in said sections the selective drawing in and exhausting of air from the respective sections to change the pressure between the sections and to induce the longitudinal flow and to provide a uniform and predictable cooling cycle for the articles passing longitudinally through the furnace.

2. The method in accordance with claim 1 in which the step of inducing longitudinal flow includes a greater quantity air from said second section than is drawn in at said second section to create a longitudinal flow in said tunnel furnace.

3. A tunnel furnace for cooling articles with a controlled temperature as the articles pass longitudinally through the furnace, said furnace comprising a plurality of successive sections through which articles are transported, conveyor means for transporting the articles in the longitudinal direction through said sections, variable temperature control means in each of said sections for controlling the temperature of air therein, circulating means in each section for circulating the air therein transversely to the articles traveling in the longitudinal direction to obtain a more uniform air temperature about the articles in each section, temperature sensing means for sensing the air temperature within said sections, air inlet and exhaust damper means in each of said sections movable to positions to vary the quantity of cooling air drawn in relative to the quantity of exhaust air expelled, and a control means for positioning said air inlet and exhaust damper means in accordance with temperature values in said sections to induce a longitudinal flow of air between adjacent sections to provide a more uniform and predictable cooling cycle as the articles pass longitudinally through the furnace.

* * * * *